(12) United States Patent
Kotzin (10) Patent No.: US 7,024,196 B1
(45) Date of Patent: Apr. 4, 2006

(54) METHOD AND APPARATUS FOR DISTRIBUTING PROCESSING LOAD FOR DECODING RADIO FREQUENCY TRANSMISSIONS

(75) Inventor: Michael D. Kotzin, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 834 days.

(21) Appl. No.: 09/602,727

(22) Filed: Jun. 26, 2000

(51) Int. Cl.
*H04Q 7/20* (2006.01)

(52) U.S. Cl. ............... 455/445; 455/453; 455/458; 370/338; 370/328

(58) Field of Classification Search ............... 755/403; 455/11.1, 552, 553, 450, 522, 445, 453, 458; 370/338, 328
See application file for complete search history.

(56) References Cited

U.S. PATENT DOCUMENTS

| | | | | |
|---|---|---|---|---|
| 5,133,080 A | * | 7/1992 | Borras | 455/9 |
| 5,481,539 A | * | 1/1996 | Hershey et al. | 370/85.3 |
| 5,689,802 A | * | 11/1997 | Luzzatto | 455/11.1 |
| 5,890,054 A | * | 3/1999 | Logsdon et al. | 455/11.1 |
| 5,901,342 A | * | 5/1999 | Heiskari et al. | 455/11.1 |
| 5,915,208 A | * | 6/1999 | Collyer | 455/11.1 |
| 6,023,626 A | * | 2/2000 | Kinnunen et al. | 455/512 |
| 6,026,303 A | * | 2/2000 | Minamisawa | 455/446 |
| 6,052,557 A | * | 4/2000 | Kinnunen et al. | 455/9 |
| 6,108,551 A | * | 8/2000 | Lehmusto et al. | 455/450 |
| 6,125,279 A | * | 9/2000 | Hyziak et al. | 455/445 |
| 6,330,446 B1 | * | 12/2001 | Mori | 455/435 |
| 6,366,622 B1 | * | 4/2002 | Brown et al. | 375/322 |
| 6,377,805 B1 | * | 4/2002 | Anvekar et al. | 455/436 |
| 2003/0093167 A1 | * | 5/2003 | Sim | 700/90 |
| 2004/0224719 A1 | * | 11/2004 | Nounin et al. | 455/553.1 |

FOREIGN PATENT DOCUMENTS

EP 689303 A1 * 12/1995

* cited by examiner

*Primary Examiner*—Danh Dong Le
(74) *Attorney, Agent, or Firm*—Paul J. Bartusiak; Lawrence J. Chap (57) ABSTRACT

A method for receiving a radio communication in a radio communication system (100) shares the downlink processing burden among members of a local group of local stations. The method includes receiving the radio communication (302) at a first mobile station (304) of a plurality of mobile stations (300). The method further includes transmitting a local radio communication (306) from the first mobile station to an intended recipient mobile station (308) of the plurality of mobile stations.

42 Claims, 7 Drawing Sheets

METHOD AND APPARATUS FOR DISTRIBUTING PROCESSING LOAD FOR DECODING RADIO FREQUENCY TRANSMISSIONS

CROSS-REFERENCE TO RELATED APPLICATIONS

This application is related to application Ser. No. 09/603,545 entitled Method and Apparatus For Distributing Processing Load For Decoding Paging Messages In A Radio Communication System, Motorola case number CS-10463, filed on even date herewith and commonly assigned to the assignee of the present application.

BACKGROUND OF THE INVENTION

The present invention is related generally to radio communication devices. More particularly, the present invention relates to a method and apparatus for distributing processing load among a group of local radios when receiving radio frequency transmissions from a remote radio.

Radio communication systems have been developed which provide two-way radio communication of voice and data between a mobile station and fixed base stations of the system. Using a mobile station in such a system, a subscriber can initiate calls and receive calls while located in the service area adjacent one or more base stations of the system. The service area may extend a distance of 50 km or more from the base station and transmissions within the system, both from the base station and from mobile stations, are relatively high power. By a process of registration, the system maintains location information for the mobile station so that pages may be sent to alert the mobile station.

To enhance user convenience, mobile stations are portable. The mobile station may register with any base station in the system when transported in the vicinity of the base station. Ongoing radio communication with a given mobile station may be handed off among base stations to provide full mobility within the system. Examples of such systems include cellular telephone systems and trunked radio systems.

To further enhance user convenience, mobile stations are conventionally powered by a depletable energy source such as a battery. Battery power provides true portability for a limited period of time while the battery retains sufficient charge to operate the mobile station. When operated under battery power, the user of the mobile station is free to move about the service area of the system but can still initiate and receive calls.

Various techniques have been developed to reduce the power consumption of a mobile station, thereby extending the time between battery recharges. Some of these techniques are implemented at a system level. For example, in some systems, a mobile station is required only to be active only during a time period associated with transmission of a paging channel by base stations of the system. Otherwise, if not actively engaged in a call, the mobile station enters a low-power sleep mode to extend battery life. After the sleep mode, the mobile station regains synchronization with system timing to receive the paging channel, decode the information contained therein and detect a page intended for the mobile station. Other techniques for extending battery life are implemented in the design of an individual mobile station. For example, improved synchronization methods allow extension of the low power sleep mode while ensuring re-synchronization with system timing.

Even with these techniques, a substantial portion of battery life is expended detecting transmissions that might be intended for the mobile station. For example, in some implementations, when searching for a transmission from a base station, the mobile station must power up its analog front end circuit, its microprocessor or other controller and decoding circuitry. This must be done during each possible transmission of paging information, even though a transmission intended for the mobile station is received only rarely. In next generation radio communication systems, the situation is even more severe, since decoding transmissions will require substantial processing power to decode each received instance of a paging channel. This is referred to as joint detection operation.

Accordingly, there is a need for an improved method and apparatus for reducing power consumption in mobile stations of a radio communication system.

DETAILED DESCRIPTION OF THE PRESENTLY PREFERRED EMBODIMENTS

Figure 1:
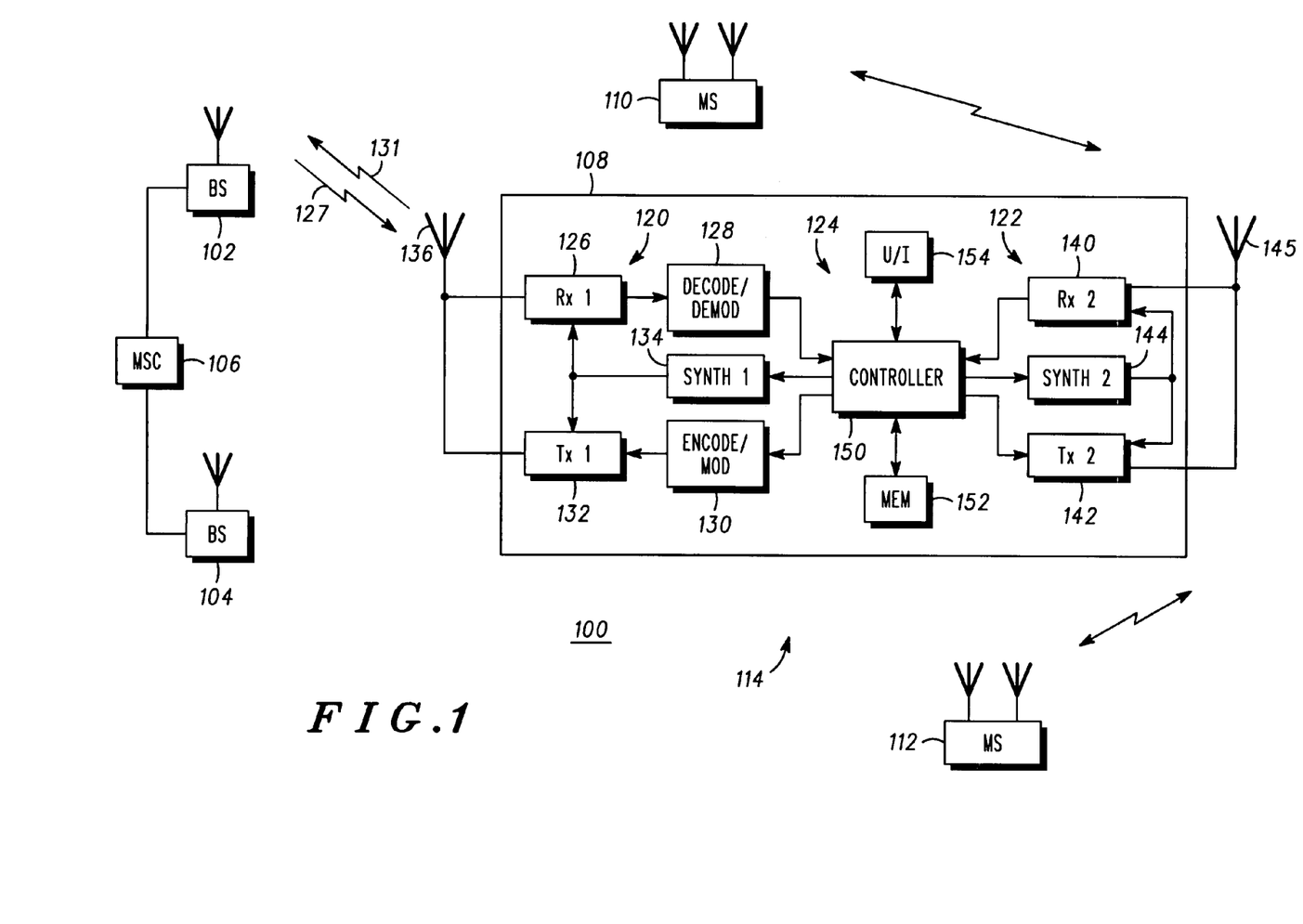
FIG. 1 is a block diagram of a radio communication system.

Referring now to the drawing, FIG. 1 is a block diagram showing a radio communication system 100. The system 100 includes a plurality of base stations 102, 104, a mobile switching center 106 and a plurality of mobile stations 108, 110, 112. The radio communication system 100 permits two-way radio communication of voice, data and other information among base stations 102, 104 and mobile stations 108, 110, 112. The system 100 may include any suitable number of base stations to provide communication capability for any number of mobile stations. The two base stations and the three mobile stations shown in FIG. 1 are exemplary only. Examples of systems which may embody the system 100 are cellular radiotelephone systems according to EIA/TIA interim standards IS-95 and IS-136 and next generation systems providing Universal Mobile Telecommunications Service (UMTS) or Wideband Code Division Multiple Access (W-CDMA).

The base stations 102, 104 are fixed and provide radio communication to mobile stations located in a fixed geographic area adjacent to each respective base station. The mobile switching center 106 is in wire line communication with the base stations 102, 104 and provides supervisory and control functions for the system 100. In particular, the mobile switching center 106 controls handoff of radio communications with a particular mobile station between base stations such as base stations 102, 104.

In the illustrated embodiment, mobile stations 108, 110, 112 together form a local group 114 of mobile stations. The mobile stations 108, 110, 112 are proximally located to permit radio communication among the mobile stations 108, 110, 112 by a low power radio communication standard. Any number of mobile stations may be included in the local group 114. The size of the local group is, to some extent, defined by the reliable transmission and reception distance for the low power radio communication standard shared by the local group. In one example, this distance is approximately 10 meters.

Mobile station 108 is shown in detail and is exemplary of the construction and operation of other mobile stations in the system 100, such as mobile station 110 and mobile station 112. Mobile station 108 includes a first radio circuit 120, a local radio circuit 122 and a control circuit 124. Operating power in the mobile station is provided by a battery.

The first radio circuit 120 includes a first receiver 126, a decoder circuit 128 and encoder circuit 130, a first transmitter 132 and a first synthesizer 134. The first receiver 126 and the first transmitter 132 are electrically coupled with a first antenna 136. The first radio circuit 120 is operable on the radio communication system 100 to provide two-way radio communication with remote radios of the system 100, such as the base station 102 and the base station 104. In one embodiment, the first receiver 126 and the first transmitter 132 are operable on a cellular radio communication system. In other embodiments, the radio communication system 100 may be implemented as a trunked radio communication system.

The receiver 126 and the transmitter 132, in combination with the synthesizer 134, form an analog front end of the first radio circuit 120. The synthesizer 134 is operable in response to control signals from the controller 150 to select a channel or frequency for receiving radio frequency (RF) signals by the receiver 126 or transmitting RF signals by the transmitter 132.

The receiver 126 receives a downlink 127 transmitted by a base station such as base station 102. The downlink 127 contains data intended for mobile stations such as mobile station 108. The data is formatted and encoded according to an accepted standard. The data are used to modulate a carrier signal at a defined channel frequency.

The decoder 128 receives analog signals detected by the receiver 126 and decodes, demodulates and otherwise detects digital data contained in the received RF signals of the downlink 127. The data may be embedded in the RF signals in accordance with any suitable radio communication protocol, such as cellular radio telephone systems referred to as IS-95 and IS-136, or next generation radio telephone systems referred to generally as Universal Mobile Telecommunication Systems (UMTS). A radio communication protocol is exemplified by an air interface, which defines the signals and data and formatting for reliable transmission and reception by two radios operating in the system. Other examples are the system defined by the TIA standard IS-2000 and the ITU standard name MC-1X and MC-3X. The detected data is provided by the decoder to the controller 150 to complete reception of a downlink 127 of one of the base stations 102, 104. In some instances, the detected data corresponds to an alert communication such as a paging channel intended to advise the mobile station 108 of the need to begin communicating with the system 100, for example, to receive an incoming call intended for the mobile station 108.

In a typical application such as a cellular telephone or UMTS system, the paging channel is the vehicle for communicating with mobile stations when they are not assigned to a traffic channel. As the name implies, its primary purpose is to convey pages, that is, notifications of incoming calls, to the mobile stations. The paging channel carries the responses to mobile station accesses, both page responses and unsolicited originations. Successful accesses are normally followed by an assignment to a dedicated traffic channel. Once on a traffic channel, signaling traffic between base and mobile can continue interspersed with the user traffic. Thus, the paging channel in such as system forms an alert communication.

For transmission of an uplink 131 to one of the base stations 102, 104, digital data is provided by the controller 150 to the encoder 130. The encoder formats the data for transmission by the transmitter 132. The transmitter modulates a carrier signal provided by the synthesizer 134 to produce RF signals at the antenna 136 for transmission to the base station 102, 104 on the uplink 131.

The local radio circuit 122 includes a second or local receiver 140, a second or local transmitter 142 and a second or local synthesizer 144. The local radio circuit 122 preferably operates to provide a low power local radio link. In the illustrated embodiment, the local radio circuit 122 operates in conjunction with the Bluetooth radio communication standard. The Bluetooth standard has been implemented to provide short distance (such as ten meters), low power (such as 100 mW), two-way radio communication of data among suitably equipped wireless communication devices. Other local radio communication technology may be substituted to provide the local radio links between the mobile station 108 and mobile stations 110, 112. This includes equipment such as wireless local area network (LAN) equipment, HyperLAN equipment, and equipment according to IEEE standard 802.111a "Telecommunications and information exchange between systems—Local and metropolitan area networks—Specific requirements—Part 11: Wireless LAN Medium Access Control and Physical Layer Specifications: High Speed Physical Layer in the 5 GHz Band." Alternatively, non-radio communication technology may be used to provide such communication links, an example being infrared data communication.

In some embodiments, the first radio circuit 120 and the second radio circuit 122 may be combined into a single radio circuit which is operable on a cellular or other long range mobile communication system as well as a short range, low power radio system. Alternatively, portions of the two radio circuits 120, 122, may be combined to provide the necessary functionality while achieving particular design goals, such as reducing power consumption or physical size of the mobile station 108.

The first radio circuit 120 and the second radio circuit 122 together in the illustrated embodiment form a radio means for receiving radio communication. The first radio circuit 120 is configurable for two-way radio communication with one or more remote radios such as base stations 102, 104. The first radio circuit may be so configured by providing operating power and tuning the receiver 126 and the transmitter 132 to appropriate communication frequencies and receiving and transmitting according to the controlling air interface standard. Similarly, the local radio circuit 122 is configurable for low power radio communication with other members of a local group such as the group including mobile stations 108, 110, 112.

The control circuit 124 includes a controller 150, a memory 152 and a user interface 154. The second receiver 140 and the second transmitter 142 are coupled to a second antenna 145. The control circuit 124 controls overall operation of the mobile station 108. The controller 150 is implemented as a microprocessor or digital signal processor, or a combination of the two, in the illustrated embodiment. The controller 150 operates in conjunction with data and instructions stored in the memory 152 to control the operation of the mobile station 108. The user interface 154 permits user control of the mobile station 108. In a typical embodiment, the user interface 154 includes a display, a keypad, a speaker and a microphone.

In particular, the control circuit 124 is operable in conjunction with the first radio circuit 120 to decode a radio communication received as a downlink 127 from one of the base stations 102, 104. Further, the control circuit 124 is operable in conjunction with the local radio circuit 122 to transmit a local radio communication in response to the radio communication received on the downlink. Still further, the control circuit 124 is operable to identify an intended recipient of the radio communication and to transmit the local radio communication to an associated mobile station, such as mobile station 110 or mobile station 112, when the intended recipient is the associated mobile station.

Thus, the first radio circuit 120 including the first receiver 126 and the decoder 128 forms a receiving means for receiving downlink radio transmissions. In alternative embodiments, some of the functionality provided by the decoder circuit 128 may be shared by the controller 150. Also, it is known to implement a receiving circuit such as the first receiver circuit 120 as a zero intermediate frequency (ZIF) receiver or as a direct conversion receiver. Such receiver types translate the relatively high reception frequency of the radio frequency signals on the downlink 127 to a lower frequency for processing within the mobile station 108. The local transmitter 142, in conjunction with the synthesizer 144, forms a local transmitting means for radio communication of data to an associated portable electronic device in response to the downlink radio transmissions.

In such an embodiment, the mobile station 108 may be configured as any type of portable electronic device, such as a cellular or other radio telephone, a personal digital assistant including wireless communication capabilities or any electronic processing device with wireless communication capability. Similarly, the other mobile stations in the system 100, mobile station 110 and mobile station 112, may be configured as any suitable portable electronic device.

The controller 150, in conjunction with the decoder 128 forms a decoding means for decoding the downlink radio transmission in conjunction with receiving means formed by the receiver 126. Similarly, the controller 150 forms a control means for determining an intended recipient of the downlink radio transmission. As noted, the controller 150 is preferably a general purpose or dedicated processor operating in response to program code stored in the memory 152. As such, the controller 150 provides a variety of functions at different times and in response to differing stimulus. In place of the controller 150, hardwired logic may be provided to provide similar functionality. Any other suitable processor or processing technology may be substituted for the controller 150 to provide the functionality described herein.

Members of the local group 114 determine among themselves which radio or radios of the local group will be responsible for receiving downlink radio communications and alert communications from other radios. Thus, the control circuit 124 forms a control means coupled with the radio means formed by the first radio circuit 120 and the local radio circuit 122 for detecting at least one of paging channel information and a local radio communication. If the mobile station 108 has been assigned to receive paging channel information and other alert communications for the local group 114, the paging channel information is received by the radio means such as the first radio circuit 120 from a remote radio such as a base station 102. The paging channel information is intended for a member of a local group of radios such as local group 114, including the portable communication device formed by the mobile station 108. The control circuit 124 of the mobile station 108 subsequently determines if the paging channel information is intended for the mobile station 108 or another member of the local group 114. If another radio of the local group 114 has been assigned to receive alert communications for members of the local group 114, the local radio communication received by the radio means such as the local radio circuit 122 is received from the other member of the local group and conveys information about received paging channel information received by the other member.

Figure 2:
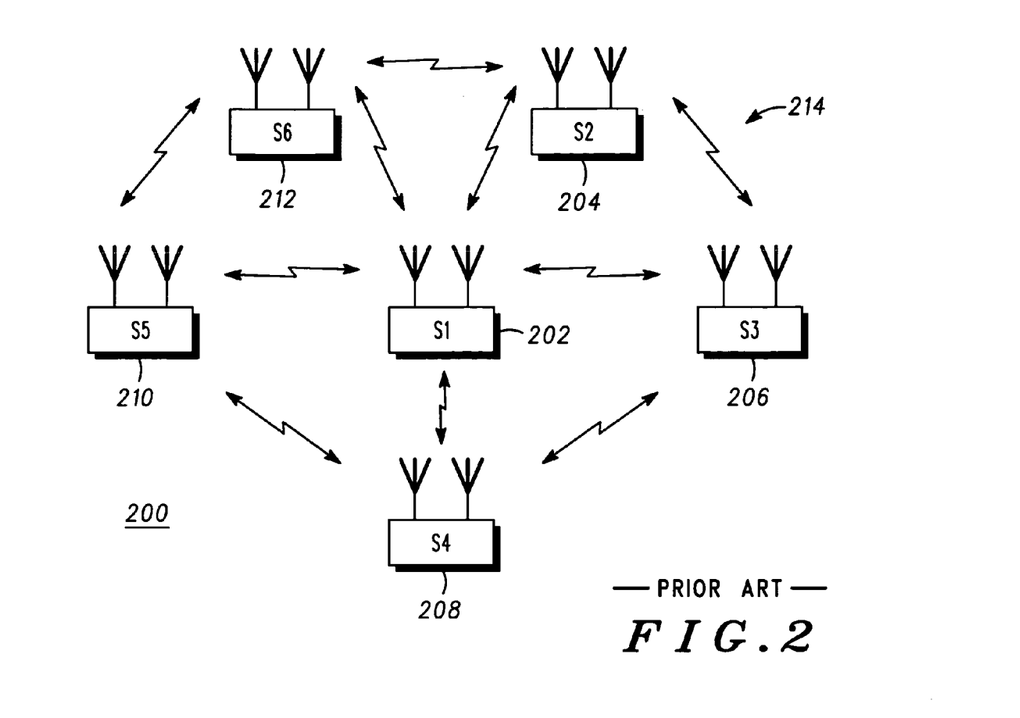
FIG. 2 is a diagram illustrating local communication in the radio communication system of FIG. 1.

FIG. 2 is a diagram illustrating local communication among a plurality 200 of mobile stations 202, 204, 206, 208, 210, 212. In FIG. 2, each of the mobile stations is in at least intermittent radio communication with each of the other mobile stations, which together form a local group 214. For radio communication, the local group 214 uses a low power radio communication technology, such as Bluetooth. Other suitable radio communication technologies or protocols may be used. In the illustrated embodiment, each of the mobile stations is able to communicate over a relatively short distance with each of the other mobile stations. For example, when the mobile stations are all within ten meters of each other, reliable radio communication may be established, providing two-way transmission of data and other information. In addition to the radio links illustrated in FIG. 2, cross-links may also be established. For example, mobile station 206 may communicate with mobile station 210 and mobile station 204 may communicate with mobile station 208.

Thus, the local radio circuits of each mobile station permit ongoing local radio communication of data and other information. Preferably, membership of the group is monitored and a list of members is maintained at at least one group member. As new members are added to the group, they may join the conversation as well. As members leave, their departure may be noted or may go unannounced. Preferably, this level of radio communication is largely invisible to the users of each mobile station. However, the radio links established between the mobile stations provide a resource which may be utilized by the respective radios or their users for file transfer or transfer of other information.

Figure 3:
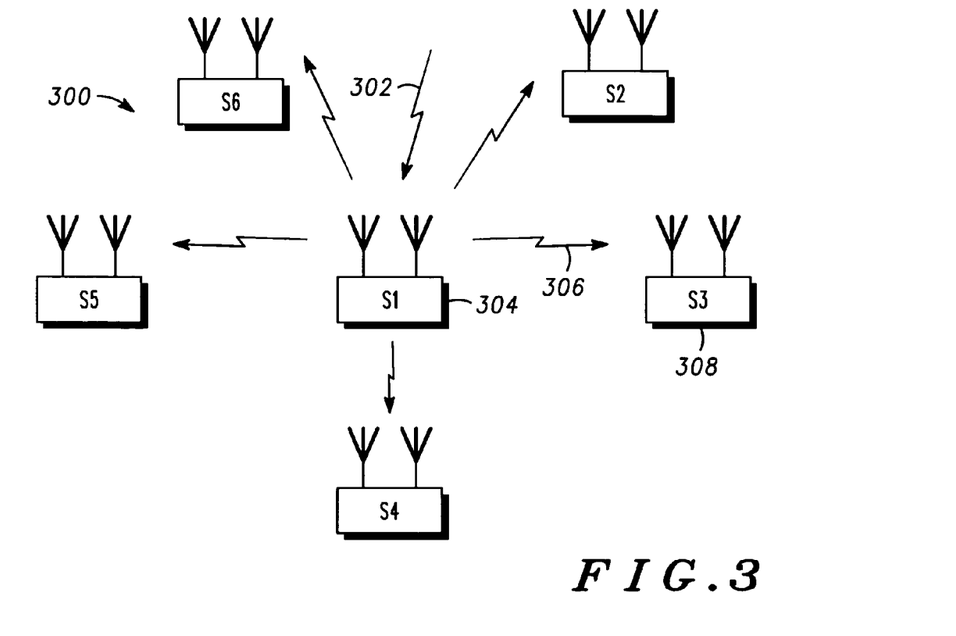
FIG. 3 is a diagram illustrating distribution of processing load among members of a local communication group in the radio communication system of FIG. 1.

FIG. 3 illustrates a method for sharing processing load among members of a local communication group 300 in the radio communication system 100 of FIG. 1. The local group 300 includes a first mobile station 304 and associated mobile stations such as mobile station 308. The first mobile station 304 has been assigned to receive transmissions from remote radios on behalf of the members of the group. This assignment has been made by cooperation among the members of the group.

While FIG. 3 shows the assigned mobile station 304 in the approximate center of the group 300, this is for convenience only. The members of the group 300 may be distributed over any appropriate distance limited only by reliable radio transmission and reception. The members of the group 300 may be in separate rooms or on separate floors of a building.

In the embodiment illustrated in FIG. 3, the first mobile station 304 receives a downlink radio transmission 302. In the illustrated embodiment, the downlink radio transmission 302 is transmitted by a remote radio such as a base station of a radio telephone system using a mobile communication protocol, such as a cellular telephone system. The downlink radio transmission 302 may include data representative of voice or other information. In addition or instead, the downlink radio transmission may include an alert communication such as a paging channel.

The first mobile station 304 determines an intended recipient of the downlink radio transmission. This is accomplished, for example, by demodulating and decoding the downlink transmission 302 and reading the data embedded in the downlink 302. The embedded data define a recipient for the downlink 302. The recipient may be defined by an embedded mobile identification number corresponding to the recipient, data in the paging channel or in a voice channel, or by any other suitable method.

When the intended recipient corresponds to an associated mobile station or other member of the group 300, the first mobile station 304 transmits information about the downlink radio transmission 302 to the associated mobile station on a low power local radio link such as link 306 transmitted to second mobile station 308. In one embodiment, the information is broadcast to all members of the group 300. In another embodiment, the information is encoded or encrypted for reception only by the intended recipient, mobile station 308.

The associated mobile station, second mobile station 308, may be associated with the first mobile station 304 in any convenient manner. It is envisioned herein that the members of the local communication group 300 will share identification information with other radios of the local group 300 of radios. The members of the group coordinate reception of downlink transmissions such as downlink transmission 302 among them and assign a receiving mobile station such as mobile station 304 to receive the downlinks. Subsequently, the assigned mobile station receives, decodes and processes downlink transmissions such as downlink transmission 302 for conveyance to an intended recipient among the radio communication group 300.

In the particular case of a paging channel on the downlink 302, subsequently the assigned mobile station receives a paging channel from a remote radio of the radio communication system in which the mobile stations operate. The assigned mobile station identifies in the paging channel the intended recipient of the paging channel and then determines correspondence between the intended recipient and respective identification information for one or more radios of the group. For example, the shared identification information may be stored in memory at the assigned mobile station. When a paging channel or other communication is received, the stored information is searched for a match with the information in the downlink identifying the intended recipient. If there is a match, information about the downlink or paging channel is transmitted to the intended recipient. If there is no match or correspondence, the downlink or paging channel is discarded. Thus, the first mobile station 304, in conjunction with the other members of the radio communication group, coordinates reception of subsequent downlink radio transmissions among a plurality of mobile radio communication stations, the group 300, including at least the associated mobile station, second mobile station 308.

All but one mobile stations are not the assigned station. As is the case with the assigned mobile station, the non-assigned mobile stations share identification information with other radios of the local group of radios. Subsequently, such a non-assigned radio receives information about a received paging channel or other downlink transmission intended for the non-assigned radio from the one radio which has been assigned by the local group for receiving paging channels and other downlink transmissions for all radios of the local group.

Thus, whenever a group of subscribers congregate in close proximity, the illustrated method and apparatus operates to reduce the processing load placed on any given mobile station in the group by sharing the processing load among mobile stations of the group. For example, when users of the mobile stations of the group congregate in a busy public location, or in a private location such as a meeting in a conference room, these users have access to two separate radio communication systems. The first radio communication system provides two-way radio telephone service for voice and data transmission. A local communication system, such as Bluetooth, provides a second radio communication system.

In accordance with the illustrated embodiments, instead of each respective mobile station independently demodulating and decoding the downlink from the base station on the first radio communication, the decoding task is distributed among all the members of the group of mobile stations that are within range of each other's local radio communication circuit. In this way, only one mobile station has to decode the downlink at a given time. Other mobile stations do not have to energize the analog front end circuitry, decoders, controllers, and so forth, needed to receive the downlink. If a downlink transmission intended for reception by a member of the group is detected by the assigned mobile station, information about the downlink transmission may be conveyed over the local radio link to the intended recipient. After the assigned mobile station receives and decodes the information, the results are sent to all the proximal devices of the group via the short-range, low power local radio communication link.

The decoding operation may be distributed among the group of users in any suitable fashion. In one embodiment, among the plurality of mobile stations of the group, one mobile station is selectively assigned as the first mobile station for receiving the downlink transmission. In another embodiment, among the plurality of mobile stations of the group, the decoding task may be accomplished by sequentially assigning one mobile station of the plurality of mobile stations as the first mobile station to decode the downlink transmission.

In a first example of this embodiment, each mobile station sequentially is assigned to receive the downlink during a predetermined time period. After the time period has elapsed, responsibility for receiving the downlink transmission is passed to another mobile station in the sequence.

In a second example, each mobile station receives a predetermined number of downlink transmissions, such as one transmission. After the predetermined number is reached, responsibility for receiving downlink transmissions passes to a subsequent mobile station in the group.

In still another embodiment, the plurality of mobile stations among them may identify one mobile station having best radio reception characteristics. One example is identifying a best received signal strength indication (RSSI). The identified mobile station may then be assigned among the group as the first mobile station for receiving downlink transmissions. This embodiment may be especially suitable, for example, in a situation where the group of users of the mobile stations is located in a conference room with one of the users being near a window and having better reception of downlink transmissions from a remote radio.

In still another embodiment, the plurality of mobile stations among them may identify one mobile station having particular battery capabilities. This could include identifying a mobile station having best battery capabilities, such as most stored charge or longest time to discharge, or this could include identifying a mobile station having worst battery capabilities, such as least stored charge or shortest time to discharge. One example is determining at each mobile station an indication of remaining battery power. Each mobile station in turn communicates its respective remaining battery power to members of the local group. Based on this information, one mobile station is identified as having the particular battery capabilities. Using this information, the identified mobile station may be assigned as the first mobile station for receiving downlink transmissions, for example, if it has best battery capabilities. Conversely, the identified mobile station, if it has worst battery capabilities, may be designated as not to be assigned as the first mobile station for receiving downlink transmissions.

Figure 4:
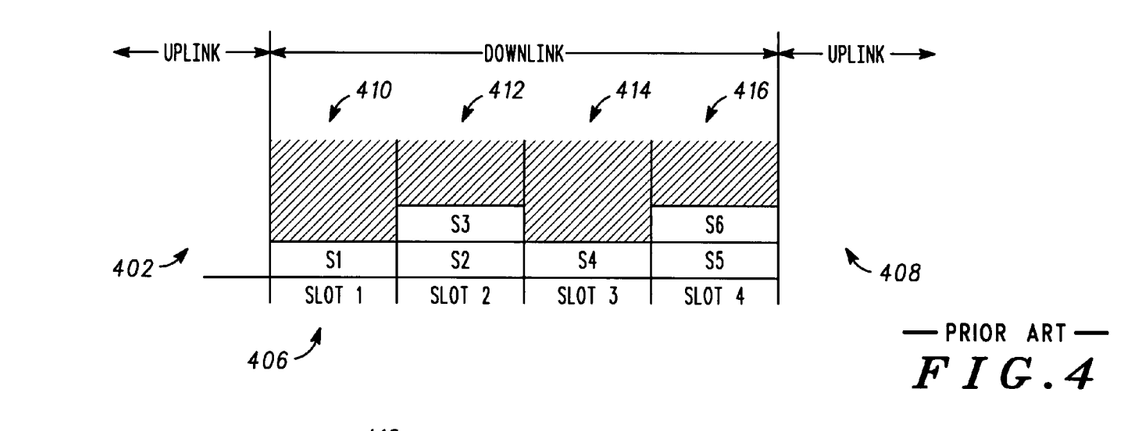
FIG. 4 is a timing diagram illustrating time slot assignments in a prior art radio communication system.

FIG. 4 illustrates a prior art method of transmitting radio communications in a time division duplex (TDD) radio communication system. In a TDD system, uplink transmissions from a mobile station to a base station alternate with downlink transmissions from a base station to mobile stations. Thus, the first uplink transmission 402 is followed by a downlink transmission 406. The downlink transmission 406 is followed by a subsequent uplink transmission 408. Each downlink transmission is further subdivided into a plurality of slots. In FIG. 4, the downlink transmission 406 includes a first slot 410, a second slot 412, a third slot 414 and a fourth slot 416. In the illustrated system, multiple users are assigned to each respective time slot 410, 412, 414, 416. Thus, referring to the group 300 of mobile stations in FIG. 3, the first mobile station 304, designated S1, is assigned a downlink time slot in the first slot 410. In this type of radio communication system, each mobile station must receive the transmission in its assigned time slot and decode the time slot information to locate a transmission for which it is the intended recipient. The area in the first time slot 410 labelled S1 corresponds to the transmission of information intended for the first mobile station S1. The cross-hatched area of the time slots shows communication assigned to other users in the system. In a similar fashion, the mobile stations designated S2 and S3 are assigned to second downlink time slot 412. Still further, the other members of the group, mobile stations designated as S4, S5 and S6, are assigned to the third and fourth time slots 414, 416. In the prior art embodiment of FIG. 4, time slot assignment at a base station is random for any given mobile station.

With the mobile stations of the group assigned this way, the mobile station which is assigned by the group for receiving downlink transmissions must receive all time slots of the downlink 406 but need not be powered up for the uplinks 402, 408 The assigned mobile station enjoys reduced power consumption in that its receiving circuitry may be powered down during the uplinks 402, 408.

Figure 5:
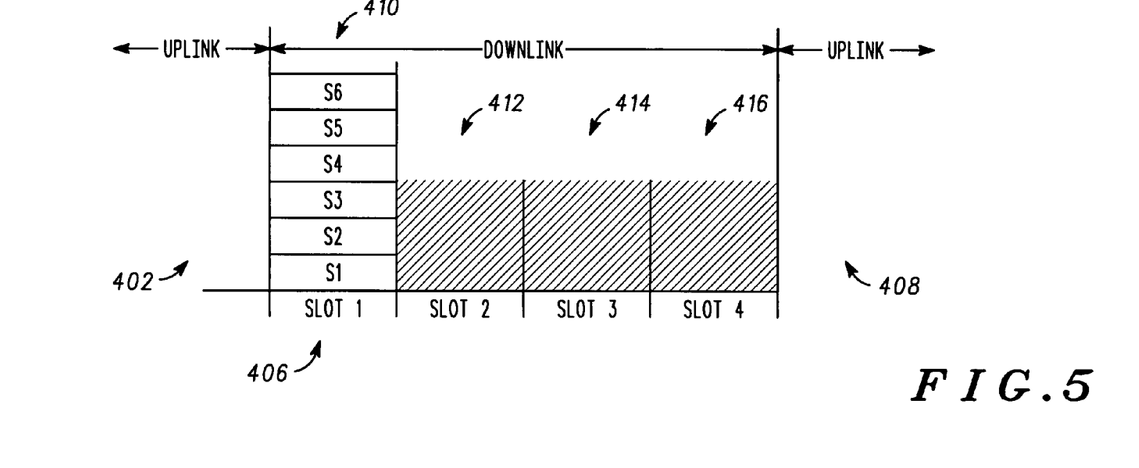
FIG. 5 is a timing diagram illustrating time slot assignments in the radio communication system of claim 1.

FIG. 5 illustrates a timing diagram showing time slot assignments in the radio communication system of claim 1. In FIG. 5, the uplink transmission times 402, 408 again alternate with the downlink transmission time 410. Similarly, in FIG. 5 as in FIG. 4, the downlink 410 is divided into four time slots, including time slots 410, 412, 414, 416. However, in the system illustrated in FIG. 5, radio communications intended for any local station of the plurality or group of mobile stations are transmitted during a common predefined time period. Any time could be chosen for the common time period. In the embodiment of FIG. 5, the chosen time period is time slot 410. As is illustrated, the transmissions, if any, intended for the mobile stations designated S1, S2, S3, S4, S5, S6 are all assigned for transmission during the first time slot 410.

In this manner, optimal assignments of time slots have been made, insuring that all users in the group are sent in the same time slot 410. This simplifies decoding of information intended for all mobile stations of the group within a single mobile station of the group. This prevents the situation shown in FIG. 4 of spreading the proximal users' information across several time slots 410, 412, 414, 416. In FIG. 5, all the users share the same time slot 410, meaning that the assigned mobile station need only energize its receive circuitry during the first time slot 410.

Implementation of this requires that the base stations transmitting to the mobile stations have information about the identities of the mobile stations forming the group. Thus, one of the mobile stations in the group preferably transmits from the one mobile station of the plurality of mobile stations to a remote radio of the radio communication system identification information for each mobile station of the plurality of mobile stations.

Figure 6:
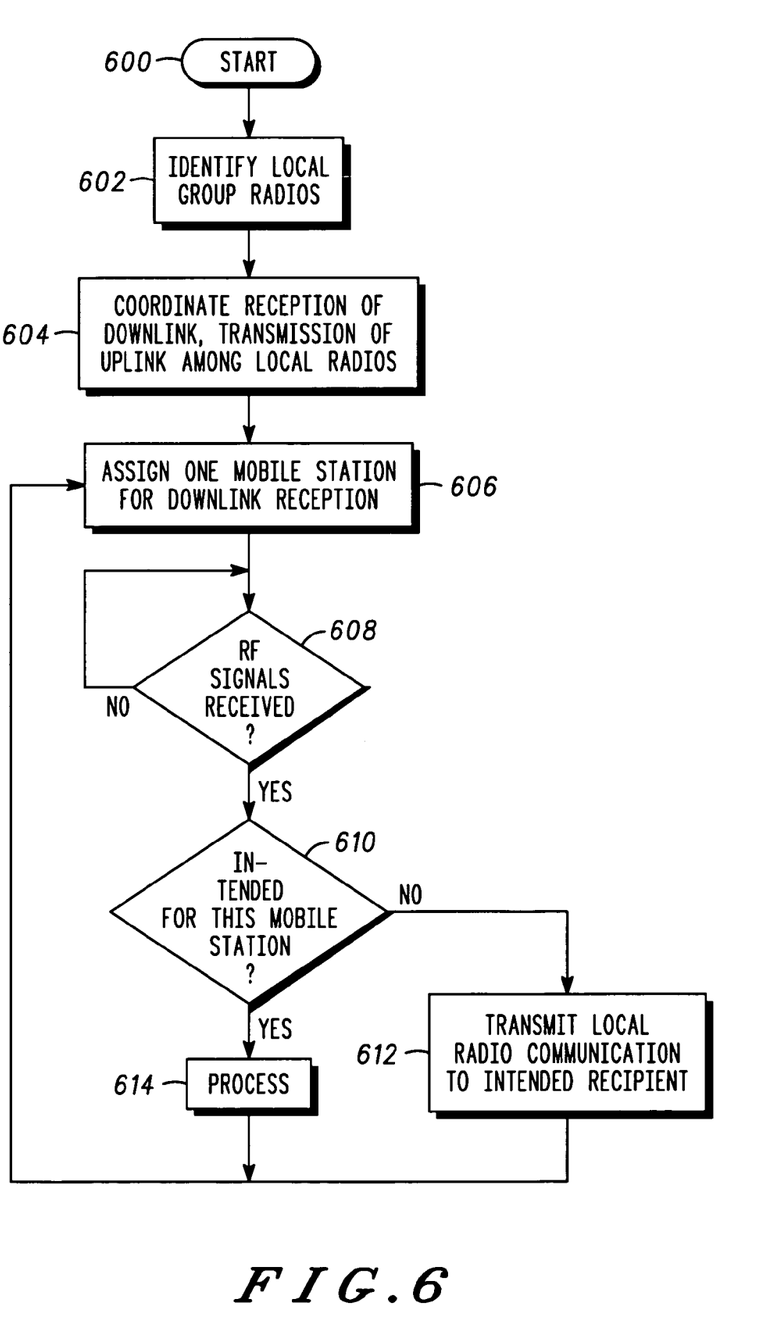
FIGS. 6–10 are flow diagrams illustrating methods of operating the radio communication system of FIG. 1.

FIG. 6 is a flow diagram illustrating a method of operating the radio communication system of FIG. 1. The method begins at block 600.

At block 602, all local group radios are identified to each other. This is preferably done using low power, short distance local radio links established among the radios of the group. An example of such a radio communication system for establishing such links is the Bluetooth radio standard. However, other wireless communication techniques, including infrared transmission and use of the cellular transmitter and receiver of the mobile stations may be used.

At block 604, the mobile stations of the local group coordinate reception of downlink transmissions and transmission of uplink transmissions among local radios. For example, if it is desired to have all transmissions or paging channels intended for the local group consolidated into a single time slot, as is illustrated at FIG. 5, this information is aggregated and one local station of the group is assigned to transmit the information to a base station for subsequent processing. At block 606, one mobile station is assigned for downlink reception. As described above, assignment of a mobile station to receive downlink transmissions for the entire group may be made in any suitable fashion. Responsibility for downlink reception may be passed around in a round robin fashion after lapse of predetermined time intervals or after detection of a predetermined number of downlinks.

At block 608, it is determined if RF signals have been received at the assigned mobile station. The assigned mobile station remains in a loop waiting for receipt of a downlink containing information intended for one or more of the members of the group. The assigned mobile station may activate its receiver circuit only during predetermined times, such as during transmission of a paging channel by a base station in order to reduce or minimize battery drain.

Once radio signals have been received at block 610, it is determined if the radio signals are intended for the receiving mobile station. If not, the receiving mobile station transmits a local radio communication to the intended recipient, block 612. This is done using the low power, local radio link such as Bluetooth. Control then returns to block 606. At block 606, if appropriate, a new mobile station may be assigned for downlink reception. Assignment of one mobile station generally includes de-assignment of the previously assigned mobile station.

If, at block 610, it was determined that the received RF signals were intended for the assigned mobile station, at block 614 the received transmission is processed. Control then proceeds to block 606 for assignment of a different mobile station, if necessary, and subsequent processing.

Figure 7:
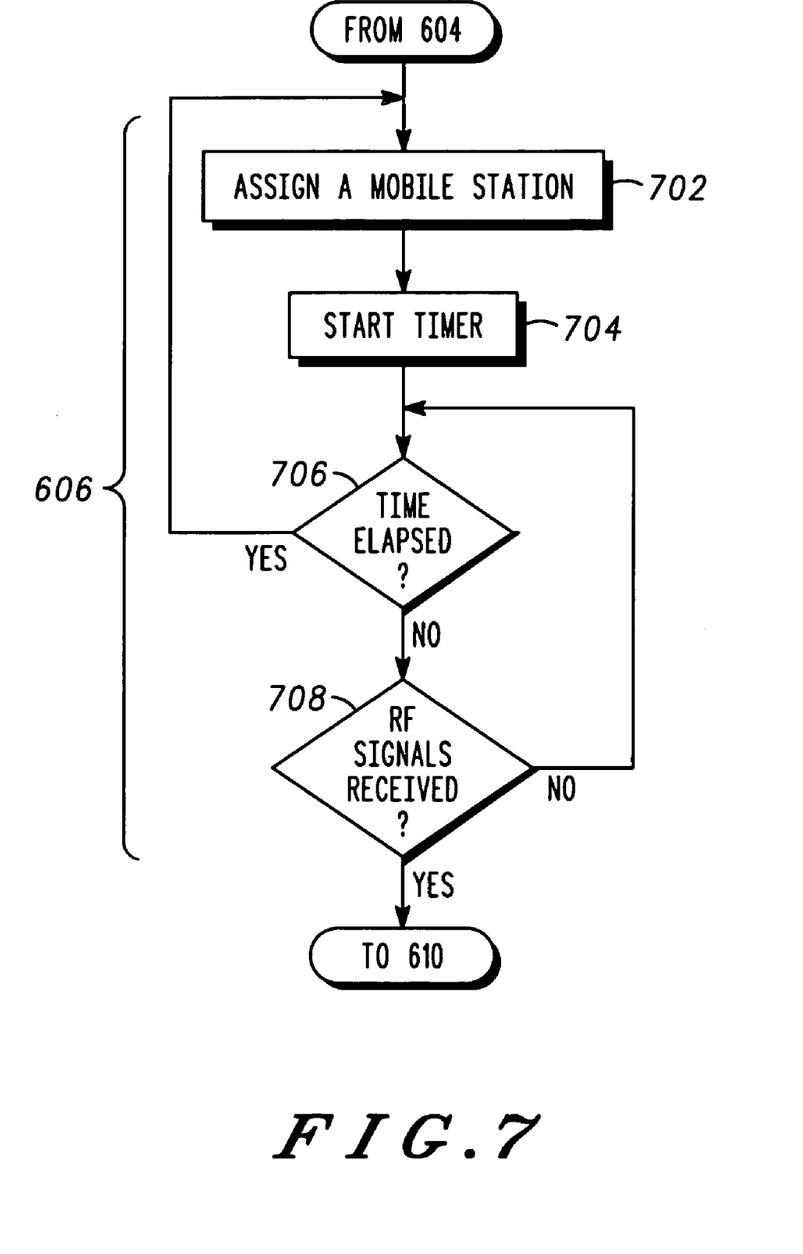

FIG. 7 is a flow diagram illustrating an alternative embodiment of the acts illustrated in block 606 of FIG. 6. In FIG. 7, assignment of a mobile station to receive downlink transmissions for the local group is done in a round robin fashion with reassignment after elapse of a timer. Thus, at block 702, an initial mobile station is assigned for downlink reception. At block 704, a timer is started to time duration during which the mobile station will be assigned. The timer may be maintained at the assigned mobile station, another mobile station or more mobile stations in the local group. At block 706, it is determined if time has elapsed. If so, control returns to block 702 for de-assignment of the presently assigned mobile station and assignment of a new mobile station for receiving downlink transmissions intended for one or more members of the group. If, at block 706, the timer had not elapsed, at block 708 it is determined if RF signals have been received. If not, control returns to block 706 to again test the timer. If RF signals are received at block 708, control then proceeds to block 610, FIG. 6.

Figure 8:
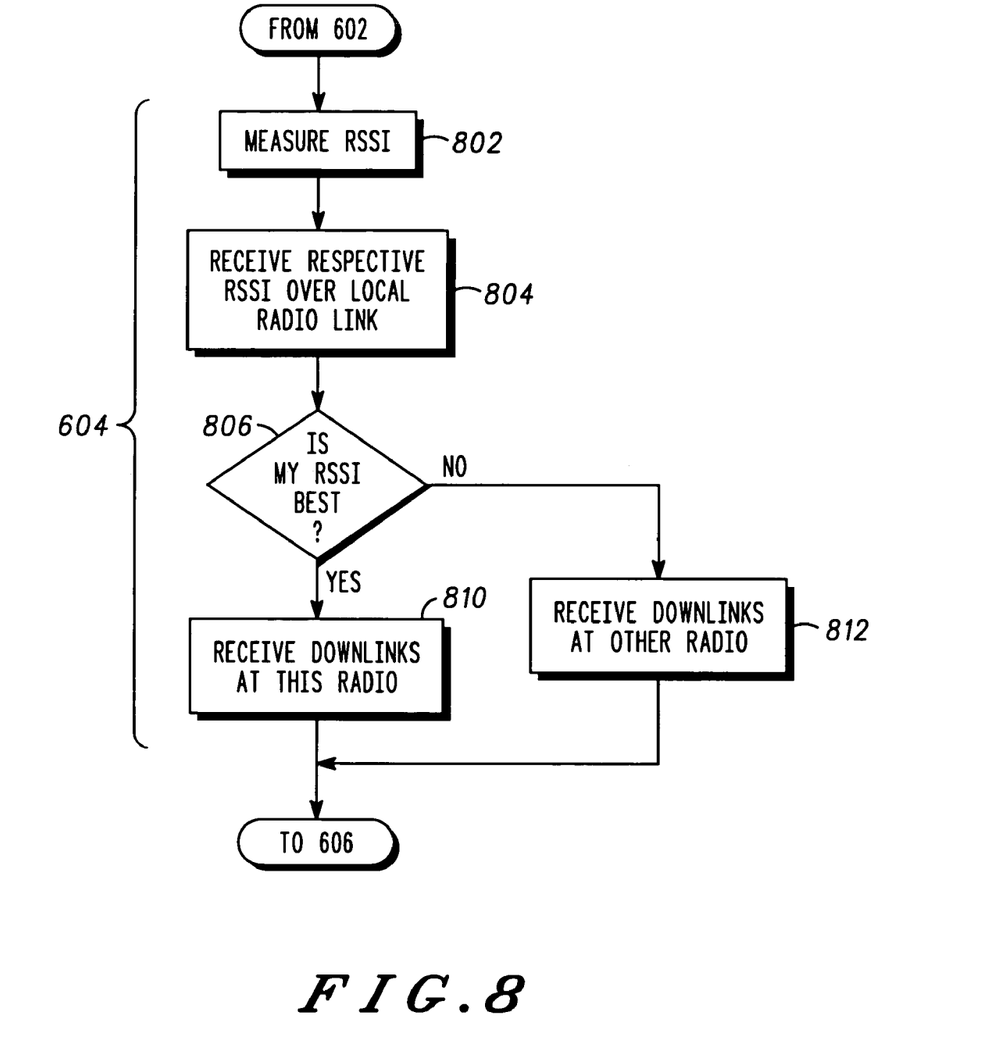

FIG. 8 illustrates an alternative embodiment of block 604, FIG. 6. In the embodiment illustrated in FIG. 8, the assignment of a mobile station to receive downlink transmissions intended for one or more members of the local group is made according to reception characteristics of the respective mobile stations. Thus, at block 802, each mobile station of the group measures a reception characteristic, such as received signal strength indication (RSSI). At block 804, the mobile stations of the local group share their respective RSSI values using the local radio link. At block 806, each mobile station determines if its respective RSSI value is the best of all respective RSSI values for the local group. If so, at block 810, the mobile station is assigned to receive downlinks. If not, and another mobile station has the best RSSI value, at block 12, the other mobile station is assigned to receive downlinks on behalf of the group.

As noted above, acts similar to those shown in FIG. 8 could be taken to identify a mobile station having particular battery characteristics. Assignment of a mobile station having best battery characteristics or specific non-assignment of a mobile station having worst battery characteristics could be made based on the identification and shared information. The blocks of FIG. 8 can be readily modified by those ordinarily skilled in the art to produce method steps describing this process.

It is to be noted that the techniques for assigning one mobile station for reception of downlinks on behalf of all mobile stations in the local group may be combined in a particular situation. Thus, it may be initially determined if any mobile station of the group possesses particularly good reception characteristics. If not, then assignment may be made on some other basis, such as by random assignment or assignment in sequence.

Figure 9:
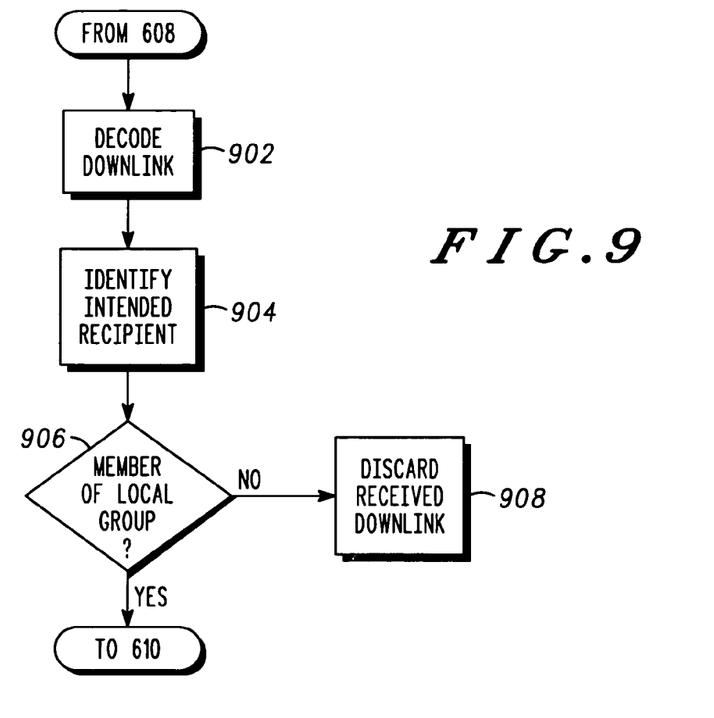

FIG. 9 is a portion of a flow diagram illustrating an alternative embodiment of steps of the flow diagram of FIG. 6. At block 902, the received downlink is decoded by the assigned mobile station on behalf of the rest of the local group. At block 904, the intended recipient of the downlink is identified using data or other information embedded within the downlink. For example, a mobile identity number may be read from the embedded data. At block 906, it is determined if the intended recipient is a member of the local group. If so, control proceeds to block 610, FIG. 6. However, if the intended recipient is not a member of the local group, at block 908 the received downlink transmission is discarded and no further processing occurs for that downlink.

Figure 10:
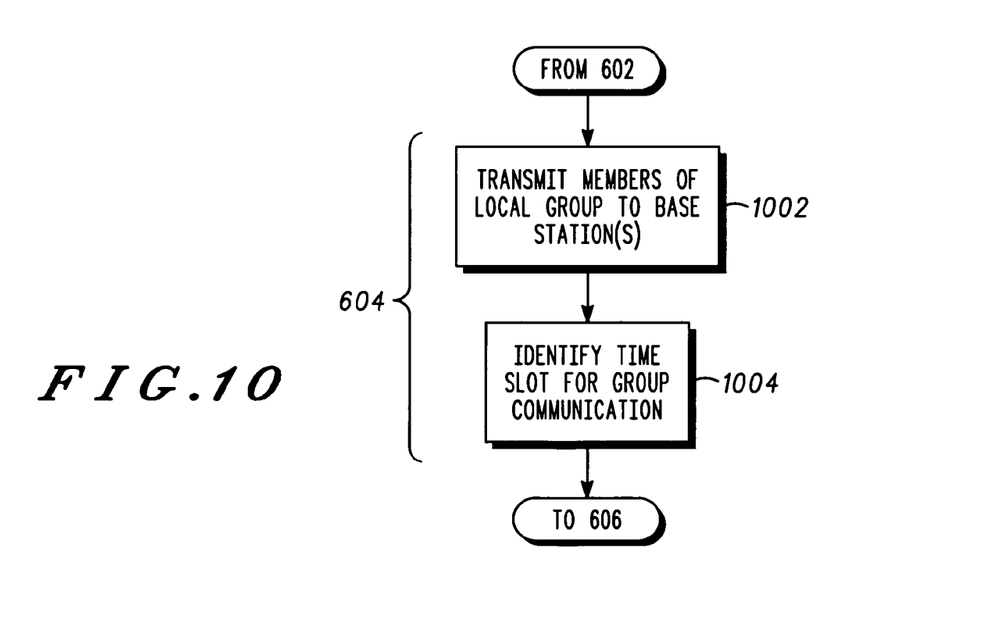

FIG. 10 illustrates an alternative embodiment of the acts of block 604, FIG. 6. At block 1002, the assigned mobile station transmits identification information for members of the local group to one or more base stations in proximity to the local group. This identification information is preferably used by the radio communication system including the mobile switching center and the base stations of the system for controlling and combining downlink transmissions intended for members of the group. At block 1004, a time slot is identified for group communication. This is similar to the aggregation of downlink transmissions in a common time slot illustrated in FIG. 5.

From the foregoing, it can be seen that the present embodiments provide an improved method and apparatus for operating a mobile station as part of a local group of mobile stations in a radio communication system. Mobile stations of the local group use a low power local radio network for communicating information about their capabilities and for assigning one mobile station of the group for receiving downlink transmissions. Assignment of the mobile station may change over time to share the processing load among the members of the local group. In this manner, the processing power and battery drain required by each individual mobile station of the local group is reduced.

While a particular embodiment of the present invention has been shown and described, modifications may be made. It is therefore intended in the appended claims to cover such changes and modifications which follow in the true spirit and scope of the invention.

I claim:

1. A method for receiving a radio communication in a radio communication system, the method comprising:

among a plurality of mobile stations, selectively assigning one mobile station of the plurality of mobile stations, each of which is capable of receiving radio communications directly from a remote radio, as a first mobile station for receiving radio communications from the remote radio intended for one or more of the plurality of mobile stations;

receiving the radio communication from the remote radio at the first mobile station of the plurality of mobile stations; and transmitting a local radio communication, corresponding to the radio communication received from the remote radio, from the first mobile station to an intended recipient mobile station from the plurality of mobile stations of the radio communication received from the remote radio.

2. The method of claim 1 wherein selectively assigning comprises:

among the plurality of mobile stations, identifying a mobile station having particular battery characteristics; and assigning the mobile station as the first mobile station for receiving radio communications.

3. The method of claim 1 wherein selectively assigning comprises:

among the plurality of mobile stations, sequentially assigning one mobile station of the plurality of mobile stations as the first mobile station.

4. The method of claim 1 wherein selectively assigning comprises:

among the plurality of mobile stations, assigning the first mobile station to receive the radio communication.

5. The method of claim 1 wherein selectively assigning comprises:
assigning the first mobile station to receive radio communications during a predetermined time period.

6. The method of claim 1 wherein selectively assigning comprises:
assigning the first mobile station to receive radio communications; and
subsequently, de-assigning the first mobile station and assigning another mobile station of the plurality of mobile stations to receive radio communications.

7. The method of claim 1 wherein selectively assigning comprises:
among the plurality of mobile stations, identifying a mobile station having best radio reception characteristics; and
assigning the identified mobile station as the first mobile station.

8. The method of claim 1 further comprising:
decoding data in the radio communication;
identifying an intended recipient in the data; and
when the intended recipient corresponds to a mobile station of the plurality of mobile stations, transmitting the local radio communication from the first mobile station to the intended recipient mobile station.

9. The method of claim 8 further comprising:
when the intended recipient does not correspond to a mobile station of the plurality of mobile stations, discarding the radio communication.

10. The method of claim 1 further comprising:
transmitting from one mobile station of the plurality of mobile stations to a remote radio of the radio communication system identification information for each mobile station of the plurality of mobile stations.

11. The method of claim 10 further comprising:
transmitting radio communications intended for any mobile station of the plurality of mobile stations during a common predefined time period.

12. The method of claim 1 further comprising:
receiving the radio communication in accordance with a first radio communication protocol; and
transmitting the local radio communication in accordance with a second radio communication protocol.

13. The method of claim 12 further comprising:
transmitting the local radio communication at a relatively low transmit power for local reception by the plurality of mobile stations.

14. A mobile station operable in a radio communication system, the mobile station comprising:
a first radio circuit;
a local radio circuit; and
a control circuit operable in conjunction with the first radio circuit to decode a radio communication having an intended recipient from a remote radio and operable in conjunction with the local radio circuit to transmit to the intended recipient from one or more of a plurality of mobile stations, located locally relative to the mobile station, a local radio communication in response to the radio communication, when selectively assigned to receive radio communications from the remote radio for the one or more of the plurality of mobile stations, each of which is capable of receiving radio communications directly from the remote radio.

15. The mobile station of claim 14 wherein the control circuit is further operable to identify an intended recipient of the radio communication and transmit the local radio communication to an associated mobile station when the intended recipient is the associated mobile station.

16. The mobile station of claim 14 wherein the first radio circuit comprises:

a receiver operable on a cellular radio communication system; and
a transmitter operable on the cellular radio communication system.

17. The mobile station of claim 16 wherein the local radio circuit comprises:
a local receiver operable in a short range radio communication system including at least the associated mobile station; and
a local transmitter operable in the short range radio communication system.

18. A portable electronic device comprising:
receiving means for receiving downlink radio transmissions from a remote radio, when selectively assigned to receive radio communications for one or more of a plurality of portable electronic devices; and
local transmitting means for radio communication of data to an intended recipient of the downlink radio transmissions which is an associated portable electronic device from the one or more of a plurality of portable electronic devices, each of which is capable of receiving radio communications directly from the remote radio, in response to the downlink radio transmissions.

19. The portable electronic device of claim 18 further comprising:
decoding means for decoding the downlink radio transmission in conjunction with the receiving means.

20. The portable electronic device of claim 19 further comprising:
control means for determining an intended recipient of the downlink radio transmission.

21. A method for operating a mobile radio communication station, the method comprising:
receiving a downlink radio transmission from a remote radio;
determining an intended recipient of the downlink radio transmission; and
when the intended recipient corresponds to an associated mobile station, which is located locally relative to the mobile radio communication station receiving the downlink radio transmission, and which has selectively disabled direct communication with the remote radio, transmitting information about the downlink radio transmission to the associated mobile station on a low power local radio link.

22. The method of claim 21 further comprising:
using the low power radio link, coordinating reception of subsequent downlink radio transmissions among a plurality of mobile radio communication stations including at least the associated mobile station.

23. The method of claim 22 wherein coordinating reception comprises:
assigning a respective reception interval to each mobile radio communication station of the plurality of mobile radio communication stations.

24. The method of claim 22 wherein coordinating reception comprises:
dedicating one mobile radio communication station of the plurality of mobile radio communication stations to reception of subsequent downlink radio transmissions based on a reception parameter.

25. The method of claim 24 wherein dedicating comprises:
determining received signal strength for at least one downlink radio communication;
comparing respective received signal strengths for each mobile radio communication station of the plurality of mobile radio communication stations; and dedicating as the one mobile radio communication the mobile radio communication having best respective received signal strength.

26. A radio communication method comprising:
cooperating among a plurality of locally positioned mobile stations, each capable of directly receiving downlink radio transmissions from a remote base station in a radio communication system, to assign one mobile station of the plurality of locally positioned mobile stations to receive downlink radio transmissions from the remote base station;
at the one mobile station,
receiving a downlink radio communication at the one mobile station in accordance with a first radio communication protocol of the radio communication system,
decoding the downlink radio communication to identify an intended recipient of the downlink radio communication, and
when the intended recipient is another station of the plurality of locally positioned mobile stations, transmitting information about the downlink radio communication to the other mobile station using a low-power local radio communication protocol.

27. The radio communication method of claim 26 wherein transmitting information comprises transmitting data in accordance with the Bluetooth radio communication protocol.

28. A radio communication method comprising:
defining a local group of mobile stations in direct radio communication with one or more remote radios of a radio communication system;
within the local group, assigning a first mobile station for receiving downlink transmissions from the one or more remote radios;
subsequently, receiving the downlink transmissions;
identifying in the downlink transmissions data intended for one or more members of the local group; and
communicating the data from the first mobile station to the one or more members over a local radio communication system.

29. The method of claim 28 wherein the transmission range of the radio communications with the remote radios is greater than ten kilometer and the transmission range of the radio communications over the local radio communication system is less than 100 meters.

30. A method comprising:
wirelessly communicating among a local group, of electronic devices within local communication range of the other electronic devices within the local group and within direct radio communication range of a remote radio;
receiving at an assigned electronic device a radio transmission from the remote radio;
at the assigned electronic device, determining one or more intended recipients of the radio transmission;
when the one or more intended recipients corresponds to a member of the local group other than the assigned electronic device, wirelessly communicating to the member information about the radio transmission.

31. The method of claim 30 wherein wirelessly communicating comprises:
transmitting data from a first member of the local group intended for one or more other members of the local group; and
receiving the data at at least some of the one or more other members of the group.

32. The method of claim 30 further comprising:
assigning the assigned electronic device for receiving radio transmissions from the remote radio for all members of the local group.

33. The method of claim 32 wherein assigning comprises:
designating one electronic device of the local group as the assigned electronic device based on a performance characteristic for at least some of the members of the local group.

34. The method of claim 33 further comprising:
measuring a reception characteristic at at least some members of the group;
wirelessly communicating information about measured reception characteristics to other members of the group; and
designating the one electronic device as the assigned electronic device based on the measured reception characteristics.

35. The method of claim 32 further comprising:
de-assigning the assigned electronic device; and
assigning a next assigned electronic device for receiving the radio transmissions from the remote radio for all members of the local group.

36. The method of claim 32 further comprising:
distributing assignment for receiving radio transmissions from the remote radio for all members of the local group among all members of the local group.

37. The method of claim 30 further comprising:
distributing assignment for receiving radio transmissions from the remote radio among members of the local group.

38. The method of claim 30 wherein receiving a receiving a radio transmission comprises:
detecting a downlink transmission from a remote radio;
decoding the downlink transmission to extract data embedded in the downlink transmission; and
identifying the one or more intended recipients in response to the data.

39. The method of claim 30 wherein wirelessly communicating comprises:
transmitting information from a first electronic device according to a predefined wireless data communication protocol; and
receiving the information at at least a second electronic device.

40. The method of claim 39 wherein the predefined wireless protocol comprises the Bluetooth standard.

41. A method for receiving a radio communication in a radio communication system, the method comprising:
among a plurality of mobile stations, selectively assigning one mobile station of the plurality of mobile stations as a first mobile station for receiving radio communications from the remote radio;
not energizing at least some of the circuitry needed for receiving direct radio communications from the remote radio in at least one or more of the plurality of mobile stations which are not assigned, while radio communications from the remote radio are being transmitted;
receiving the radio communication from the remote radio at the first mobile station of the plurality of mobile stations; and
transmitting a local radio communication from the first mobile station to an intended recipient mobile station of the plurality of mobile stations.

42. The method of claim 41 wherein the circuitry not energized includes one or more of analog front end circuitry, decoders, and controllers.

* * * * *